US009811564B2

(12) United States Patent
Ishiguro et al.

(10) Patent No.: US 9,811,564 B2
(45) Date of Patent: Nov. 7, 2017

(54) POI INFORMATION PROVIDING SYSTEM, POI INFORMATION PROVIDING DEVICE, POI INFORMATION OUTPUT DEVICE, POI INFORMATION PROVIDING METHOD, AND PROGRAM THEREFOR

(71) Applicant: Clarion Co., Ltd., Saitama-shi, Saitama (JP)

(72) Inventors: Masao Ishiguro, Tokyo (JP); Haruhiko Sawajiri, Atsugi (JP); Kazushige Hiroi, Tokyo (JP); Akio Hayashi, Saitama (JP); Yasuki Horibe, Tokyo (JP)

(73) Assignee: Clarion Co., Ltd., Saitama-shi (JP)

( * ) Notice: Subject to any disclaimer, the term of this patent is extended or adjusted under 35 U.S.C. 154(b) by 399 days.

(21) Appl. No.: 14/322,687

(22) Filed: Jul. 2, 2014

(65) Prior Publication Data
US 2015/0012555 A1    Jan. 8, 2015

(30) Foreign Application Priority Data
Jul. 4, 2013    (JP) ................................ 2013-140320

(51) Int. Cl.
G06F 17/30    (2006.01)
G06Q 50/00    (2012.01)
G06Q 90/00    (2006.01)

(52) U.S. Cl.
CPC ....... *G06F 17/30528* (2013.01); *G06Q 50/01* (2013.01); *G06Q 90/00* (2013.01)

(58) Field of Classification Search
None
See application file for complete search history.

(56) References Cited

U.S. PATENT DOCUMENTS 8,682,805 B1 *    3/2014    Hansen ............... G06F 17/3087
                                             705/1.1
2010/0174709 A1 *    7/2010    Hansen ............... G06F 17/3087
                                             707/728
(Continued)

FOREIGN PATENT DOCUMENTS

| JP | 2013-36763 A | 2/2013 |
| JP | 2013-77045 A | 4/2013 |
| JP | 2013-97758 A | 5/2013 |

OTHER PUBLICATIONS

Japanese-language Office Action issued in counterpart Japanese Application No. 2013-140320 dated Mar. 28, 2017 with English translation (Nine (9) pages).

*Primary Examiner* — Debbie Le
(74) *Attorney, Agent, or Firm* — Crowell & Moring LLP

(57) ABSTRACT

Provided is a technology that allows use of a trend rating acquired more objectively. A POI information providing device includes: a storage unit which stores POI data including a POI name; a posted data acquisition unit which acquires posted data through a network; a trend rating acquisition unit which obtains a matching degree between a word included in the posted data and the POI name for each piece of the posted data, and uses a predetermined calculation expression for the matching degree to calculate and acquire a trend rating indicating an attention degree of a POI; a trend rating identification unit which identifies, when a request for the trend rating is received from another device connected through the network, the trend rating corresponding to the request; and a transmission unit which transmits the trend rating identified by the trend rating identification unit to the another device.

14 Claims, 16 Drawing Sheets

(56) References Cited

U.S. PATENT DOCUMENTS

| | | | |
|---|---|---|---|
| 2012/0116671 A1 | 5/2012 | Lee et al. | |
| 2012/0303415 A1* | 11/2012 | Edelson | G06Q 30/0282 |
| | | | 705/7.32 |
| 2013/0254900 A1* | 9/2013 | Sathish | H04W 4/02 |
| | | | 726/28 |
| 2014/0006408 A1* | 1/2014 | Rae | G06F 17/278 |
| | | | 707/740 |
| 2015/0172860 A1* | 6/2015 | Rosenstock | H04W 4/028 |
| | | | 455/456.3 |
| 2015/0339389 A1* | 11/2015 | Min | G06Q 30/0261 |
| | | | 707/754 |

* cited by examiner

POSTED DATA DB 111

| DATE/TIME | POSTER ID | TERMINAL | BODY | REGION | LONG-ITUDE | LATI-TUDE |
|---|---|---|---|---|---|---|
| 2013/04/01 12:00:00 | aaaaaaa | 1 | AAA IS GOOD. | — | 140.3 | 35.3 |
| 2013/04/01 12:00:01 | bbbbbbb | 1 | THIS IS A GOOD PLACE. | — | 140.3 | 35.3 |
| 2013/04/01 12:00:03 | ccccccc | 2 | BBB IS GOOD. | — | — | — |
| 2013/04/01 12:00:04 | ddddddd | 2 | THIS IS A GOOD PLACE. | ○○ CITY | — | — |
| 2013/04/01 12:00:07 | eeeeeee | 1 | DDD IS GOOD. | ×× CITY | — | — |
| 2013/04/01 12:00:15 | fffffff | 2 | DDD IS GOOD. | — | — | — |
| ⋮ | ⋮ | ⋮ | ⋮ | ⋮ | ⋮ | ⋮ |

POI DATA DB 112

| POI IDENTIFIER | POI NAME | CATEGORY | LONGI-TUDE | LATITUDE | ADDRESS | FIRST VALUE | SECOND VALUE |
|---|---|---|---|---|---|---|---|
| 3000024 | AAABBB | RESTAURANT | 140.3 | 35.3 | ********* | 6 | 4 |
| 3000025 | BBBCCC | TOURIST FACILITY | 140.5 | 35.5 | ********* | 4 | 3 |
| 3000026 | CCCDDD | HOTEL | 140.5 | 35.5 | ********* | 5 | 3 |
| 3000027 | DDD xBRANCH | TAVERN | 140.8 | 35.9 | ********* | 6 | 3 |
| 3000028 | EEE yBRANCH | TAVERN | 141.2 | 36.2 | ********* | 4 | 3 |
| ... | ... | ... | ... | ... | ... | ... | ... |

POI TREND DB 113

| POI IDENTIFIER (113a) | POI NAME (113b) | LONGITUDE (113c) | LATITUDE (113d) | TREND RATING (113e) |
|---|---|---|---|---|
| 3000024 | AAA | 140.3 | 35.3 | 103542304 |
| 3000025 | BBB | 140.5 | 35.5 | 98240052 |
| 3000026 | CCC | 140.5 | 35.5 | 78257781 |
| 3000027 | DDD xxx | 140.8 | 35.9 | 2578424 |
| 3000028 | DDD yyy | 141.2 | 36.2 | 48752163 |
| ⋮ | ⋮ | ⋮ | ⋮ | ⋮ |

USER-SIDE TERMINAL DEVICE 20

FIG. 15

POI DATA DB 112A

| POI IDENTIFIER | POI NAME | CATEGORY | LONGI-TUDE | LATITUDE | ADDRESS | n1 | n2 | METADATA |
|---|---|---|---|---|---|---|---|---|
| 3000024 | AAABBB | RESTAURANT | 140.3 | 35.3 | ******** | 6 | 4 | aaaa,bbbb,cccc |
| 3000025 | BBBCCC | TOURIST FACILITY | 140.5 | 35.5 | ******** | 4 | 3 | aaaa,dddd |
| 3000026 | CCCDDD | HOTEL | 140.5 | 35.5 | ******** | 5 | 3 | bbbb,eeee,ffff,gggg |
| 3000027 | DDD xBRANCH | TAVERN | 140.8 | 35.9 | ******** | 6 | 3 | gggg |
| 3000028 | EEE yBRANCH | TAVERN | 141.2 | 36.2 | ******** | 4 | 3 | ffff,hhhh |
| ... | ... | ... | ... | ... | ... | ... | ... | ... |

POI INFORMATION PROVIDING SYSTEM, POI INFORMATION PROVIDING DEVICE, POI INFORMATION OUTPUT DEVICE, POI INFORMATION PROVIDING METHOD, AND PROGRAM THEREFOR

BACKGROUND OF THE INVENTION

A technology for outputting information relating to a popular spot around a place that has been input to a PC or a smartphone as a present location or an arrival location is widespread.

A text position determination device disclosed in Japanese Patent Laid-open Publication No. 2013-77045 includes: positional information storing means for storing a word indicating a position and positional information indicating the position in association with each other; acquisition means for acquiring a text; word decomposing means for decomposing the text acquired by the acquisition means into units of words; position word extracting means for comparing the word obtained by decomposition by the word decomposing means with the word indicating the position stored in the positional information storing means, and extracting the matched word indicating the position; positional information providing means for providing another word that is included in the text including the word indicating the position extracted by the position word extracting means, with the positional information stored in the positional information storing means in association with the word indicating the position; accumulation means for accumulating the words provided with the positional information by the positional information providing means in accordance with the positional information; and output means for outputting an accumulation result from the accumulation means.

In order to identify a popular spot, for example, a device such as a server performs accumulation of a so-called popularity rating for each spot by using data posted to a weblog, a social networking service (SNS), and the like. However, posts obtained through the network often contain descriptions of fragmentary impressions, which makes it difficult to determine which spot the post relates to.

In the technology disclosed in Japanese Patent Laid-open Publication No. 2013-77045, the data relating to posts including a place name is used to accumulate the popularity rating, and hence it is not possible to use posts that do not include a place name. The fact that a population parameter used for sampling is limited to the posts including a place name means that a limitation is imposed on the kind of population parameter, with the result that the calculated popularity rating is hardly objective.

The present invention has been made in view of the above-mentioned problems, and an object thereof is to provide a technology that allows use of a trend rating acquired more objectively.

SUMMARY OF THE INVENTION

The present invention includes a plurality of measures for solving the above-mentioned problems, examples of which include the following.

In order to solve the above-mentioned problems, a POI information providing device according to one embodiment of the present invention includes: a storage unit which stores POI data including a POI name; a posted data acquisition unit which acquires posted data through a network; a trend rating acquisition unit which obtains a matching degree between a word included in the posted data and the POI name for each piece of the posted data, and uses a predetermined calculation expression for the matching degree to calculate and acquire a trend rating indicating an attention degree of a POI; a trend rating identification unit which identifies, when a request for the trend rating is received from another device connected through the network, the trend rating corresponding to the request; and a transmission unit which transmits the trend rating identified by the trend rating identification unit to the another device.

Further, in order to solve the above-mentioned problems, according to one embodiment of the present invention, the POI data may have positional information on the POI corresponding to the POI name, and the trend rating identification unit may identify, based on the request, the trend rating of the POI existing within a predetermined distance from a moving path of the another device.

Further, in order to solve the above-mentioned problems, according to one embodiment of the present invention, the trend rating acquisition unit may identify, based on a number of the POIs relating to the posted data and whether or not a posted location of the posted data and a location of the POI match each other, the trend rating by using a value obtained by summing up the matching degree obtained for each piece of the posted data for each of the POIs relating to the posted data.

Further, in order to solve the above-mentioned problems, according to one embodiment of the present invention, the trend rating acquisition unit may be configured to perform one of multiplication and addition of the trend rating by and to an index defined based on date and time at which the posted data is posted.

Further, in order to solve the above-mentioned problems, according to one embodiment of the present invention, the POI data may have a keyword corresponding to the POI name, and the trend rating acquisition unit may be configured to perform one of addition and multiplication of the trend rating to and by a predetermined value in accordance with a number of the keywords included in the posted data.

Further, in order to solve the above-mentioned problems, a POI information providing system according to one embodiment of the present invention may include: a mobile terminal; and a POI information providing device which provides the mobile terminal with information relating to a POI, the mobile terminal and the POI information providing device being connected to each other through a network, the POI information providing device including: a storage unit which stores POI data including a POI name; a posted data acquisition unit which acquires posted data through the network; a trend rating acquisition unit which obtains a matching degree between a word included in the posted data and the POI name for each piece of the posted data, and uses a predetermined calculation expression for the matching degree to calculate and acquire a trend rating indicating an attention degree of the POI; and a trend rating identification unit which identifies, when a request for the trend rating is received from the mobile terminal, the trend rating corresponding to the request, the mobile terminal including a recommendation degree output unit which outputs a recommendation degree calculated based on the trend rating identified by the trend rating identification unit.

Further, in order to solve the above-mentioned problems, according to one embodiment of the present invention, the POI data stored in the storage unit may have positional information on the POI corresponding to the POI name, and the trend rating identification unit may identify, based on the request, the trend rating of the POI existing within a predetermined distance from a moving path of the mobile terminal.

Further, in order to solve the above-mentioned problems, according to one embodiment of the present invention, the recommendation degree output unit may output the recommendation degree calculated based on the trend rating of the POI and a distance from the moving path to the POI.

Further, in order to solve the above-mentioned problems, according to one embodiment of the present invention, the trend rating acquisition unit may identify, based on a number of the POIs relating to the posted data and whether or not a posted location of the posted data and a location of the POI match each other, the trend rating by using a value obtained by summing up the matching degree obtained for each piece of the posted data for each of the POIs relating to the posted data.

Further, in order to solve the above-mentioned problems, according to one embodiment of the present invention, the trend rating acquisition unit may be configured to perform one of multiplication and addition of the trend rating by and to an index defined based on date and time at which the posted data is posted.

Further, in order to solve the above-mentioned problems, according to one embodiment of the present invention, the POI data may have a keyword corresponding to the POI name, and the trend rating acquisition unit may be configured to perform one of addition and multiplication of the trend rating to and by a predetermined value in accordance with a number of the keywords included in the posted data.

Further, in order to solve the above-mentioned problems, according to one embodiment of the present invention, the recommendation degree output unit may output screen information on a screen which displays the recommendation degree of the POI, the POI name of the POI, and the keyword associated with the POI.

Further, in order to solve the above-mentioned problems, a POI information output device according to one embodiment of the present invention may include: a transmission unit which transmits a request for a trend rating indicating an attention degree of a POI to a POI information providing device connected through a network; and a recommendation degree output unit which outputs a recommendation degree calculated based on the trend rating acquired in response to the request, in which the transmission unit transmits the request for the trend rating calculated by using a predetermined calculation expression for a matching degree between a word included in posted data acquired through the network and a name of the POI.

Further, in order to solve the above-mentioned problems, a POI information providing method according to one embodiment of the present invention for a POI information providing device including a storage unit which stores POI data including a POI name may include: acquiring posted data through a network; obtaining a matching degree between a word included in the posted data and the POI name for each piece of the posted data, and using a predetermined calculation expression for the matching degree to calculate and acquire a trend rating indicating an attention degree of a POI; identifying, when a request for the trend rating is received from another device connected through the network, the trend rating corresponding to the request; and transmitting the trend rating identified in the identifying to the another device.

Further, in order to solve the above-mentioned problems, a program according to one embodiment of the present invention for causing a computer to function as a POI information providing device including a storage unit which stores POI data including a POI name may cause the computer to execute the procedures of: acquiring posted data through a network; obtaining a matching degree between a word included in the posted data and the POI name for each piece of the posted data, and using a predetermined calculation expression for the matching degree to calculate and acquire a trend rating indicating an attention degree of a POI; identifying, when a request for the trend rating is received from another device connected through the network, the trend rating corresponding to the request; and transmitting the trend rating identified in the identifying to the another device.

According to one embodiment of the present invention, the technology that allows the use of the trend rating acquired more objectively can be provided.

Objects, configurations, and effects other than those described above become apparent from the following descriptions of embodiments of the present invention.

BRIEF DESCRIPTION OF THE DRAWINGS

FIG. 4 is a table showing an example of a POI data DB.

FIG. 5 is a table showing an example of a POI trend DB.

FIG. 15 is a table showing an example of a POI data DB according to a second embodiment of the present invention.

DESCRIPTION OF THE PREFERRED EMBODIMENTS

Now, a description is made of exemplary embodiments of the present invention with reference to the accompanying drawings.

Figure 1:
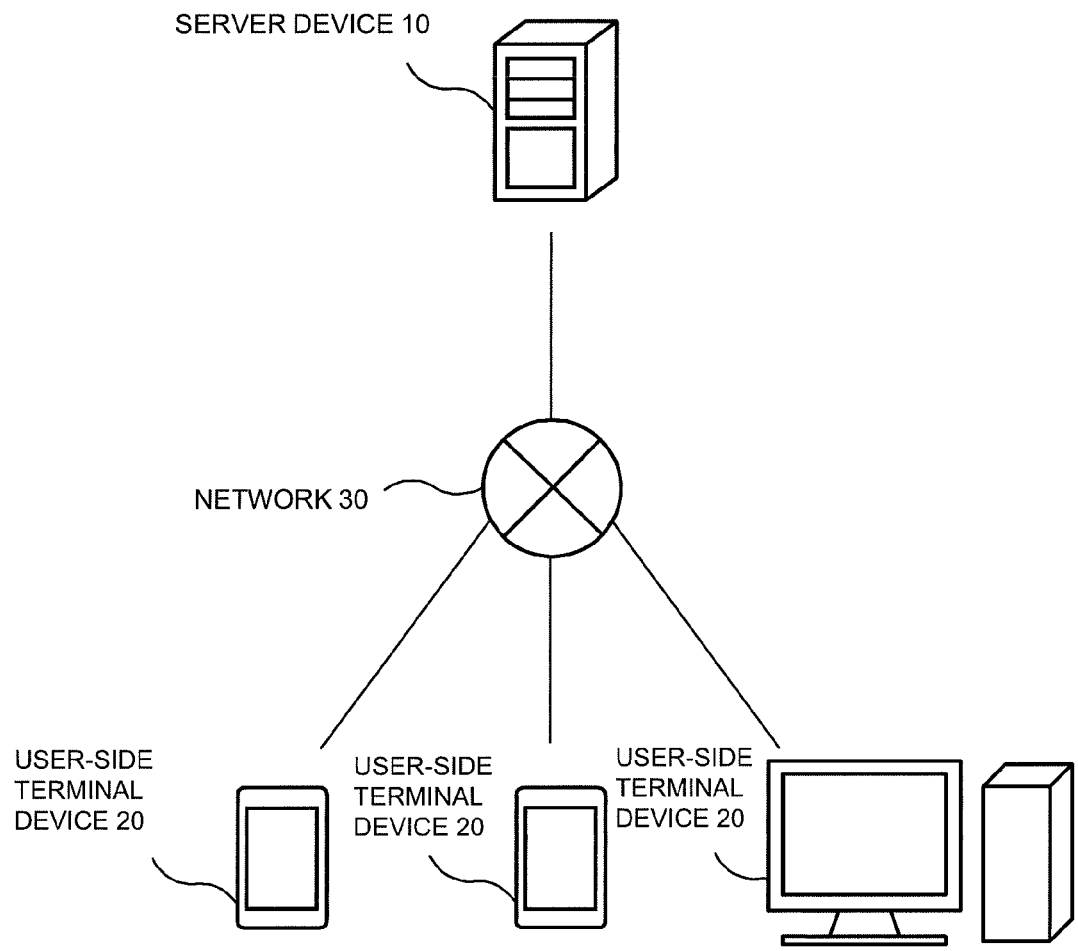
FIG. 1 is a diagram illustrating an outline of a configuration of a POI information providing system.

FIG. 1 is a diagram illustrating an outline of a configuration of a POI information providing system 1. The POI information providing system 1 includes a server device 10 and user-side terminal devices 20. The server device 10 and the user-side terminal devices 20 are connected to each other through a network 30, and any number of user-side terminal devices 20 may be connected to one server device 10 as long as the number is at least one.

The server device 10 is, for example, an electronic device such as a personal computer (PC), and is managed by, for example, a service provider. The user-side terminal device 20 is an electronic device such as a smartphone, a cellular phone, a PC, a personal digital assistant (PDA), a car navigation system, and is managed by, for example, a user who uses a service of the POI information providing system 1.

Point of interest (POI) data including a spot that interests people and information relating to the spot is registered on the server device 10 in advance. The server device 10 calculates a trend rating serving as registered information indicating an attention degree of a POI from posted data posted to an SNS, a weblog, and TWITTER (trademark), and manages the trend rating in association with POI data.

In this embodiment, on the user-side terminal device 20, a moving path is identified based on a present location and an arrival location. When receiving an input of a category of a POI requested from the server device 10, the user-side terminal device 20 transmits a request for the POI whose category has been identified and the moving path to the server device 10. The server device 10 transmits a response, which includes the trend rating of the POI and the POI data within a predetermined distance range from the moving path, to the user-side terminal device 20. The user-side terminal device 20 calculates a recommendation degree by using the received trend rating, and displays the recommendation degree on a screen.

Figure 2:
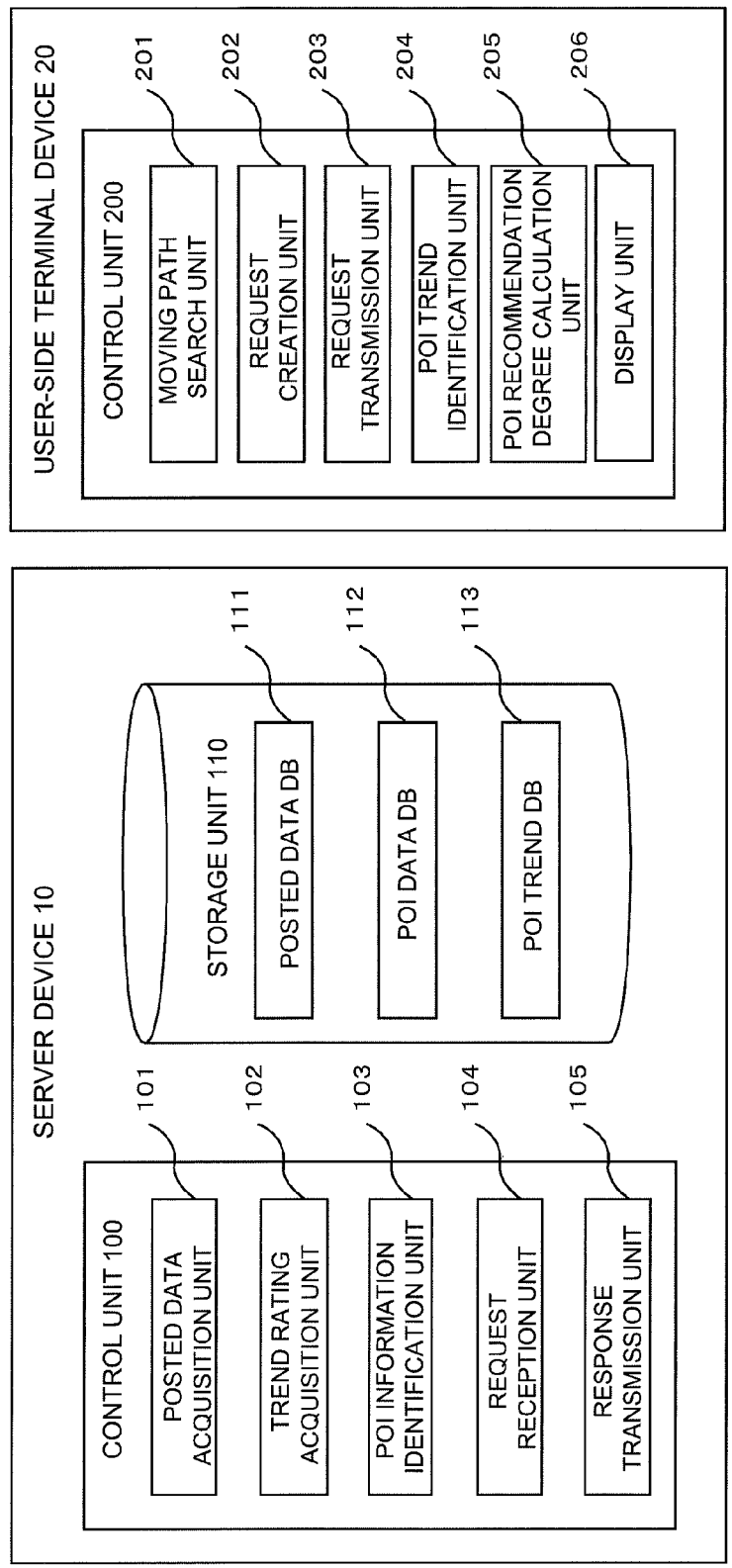
FIG. 2 is a functional block diagram of a server device and a user-side terminal device.

FIG. 2 is a functional block diagram of the server device 10 and the user-side terminal device 20.

The server device 10 includes a control unit 100 and a storage unit 110. The control unit 100 includes a posted data acquisition unit 101, a trend rating acquisition unit 102, a POI information identification unit 103, a request reception unit 104, and a response transmission unit 105.

The posted data acquisition unit 101 acquires the posted data posted on the network 30. The posted data is, for example, an article posted on a website such as an SNS, a so-called "tweet", and the like.

The trend rating acquisition unit 102 uses the posted data acquired by the posted data acquisition unit 101 to calculate the trend rating of each POI registered in the storage unit 110 in advance. When receiving a request for the POI from the user-side terminal device 20, the POI information identification unit 103 identifies POI information including the trend rating of the POI and the POI data on the requested POI based on contents of the request.

The request reception unit 104 receives the request for the POI from the user-side terminal device 20. The response transmission unit 105 transmits a response including the POI information identified by the POI information identification unit 103 to the user-side terminal device 20.

The storage unit 110 includes a posted data database (DB) 111, a POI data DB 112, and a POI trend DB 113.

The posted data DB 111 stores information such as a poster and a body of a post for each piece of the posted data acquired by the posted data acquisition unit 101. The POI data DB 112 stores the POI data in which a POI name, a category, a location of the POI, and the like are associated with one another for each POI. The POI trend DB 113 stores each POI and the trend rating in association with each other.

The user-side terminal device 20 includes a control unit 200. The control unit 200 includes a moving path search unit 201, a request creation unit 202, a request transmission unit 203, a POI trend identification unit 204, a POI recommendation degree calculation unit 205, and a display unit 206.

The moving path search unit 201 searches for the moving path based on the present location or a departure location and the arrival location. A known technology is used for the search for the moving path.

The request creation unit 202 creates a request for requesting the server device 10 for the POI within a predetermined range from the moving path. A region within which the POI is to be requested is identified in the request. Further, the category input by the user is identified in the request created by the request creation unit 202. The request transmission unit 203 transmits the request created by the request creation unit 202 to the server device 10.

The POI trend identification unit 204 identifies the POI and the trend rating that are to be displayed on a display screen from among the POI data and the trend ratings received as a response to the request. Map information updated in accordance with a movement of the user-side terminal device 20 is displayed on a display device provided to the user-side terminal device 20. The POI trend identification unit 204 identifies the POI to be displayed so that the POI in front of the user-side terminal device 20 is displayed on the map. Further, the POI trend identification unit 204 identifies the POI to be displayed so that the POI whose position has shifted from the front to the rear in accordance with the movement of the user-side terminal device 20 is hidden from the screen.

The POI recommendation degree calculation unit 205 calculates the recommendation degree of the POI based on the trend rating of the POI to be displayed and a distance between the moving path and the POI.

The display unit 206 controls screen display on the user-side terminal device 20. The display unit 206 creates screen information on the display screen on which the POI is to be displayed based on the recommendation degree and the POI data on the POI identified by the POI trend identification unit 204.

In this embodiment, the trend rating acquisition unit 102 of the server device 10 calculates the trend rating of the POI registered in the POI data DB 112 based on the posted data. When receiving the request in which the requested region and the requested category are identified from the user-side terminal device 20, the server device 10 returns the response, which includes the trend rating and the POI data on the POI existing within the requested region and corresponding to the requested category, to the user-side terminal device 20. The user-side terminal device 20 identifies the POI to be displayed from among the POIs whose information has been received, calculates the recommendation degree of the POI to be displayed based on the trend rating, and displays the recommendation degree on the map.

Next, a description is made of each piece of the information stored in the storage unit 110.

Figure 3:
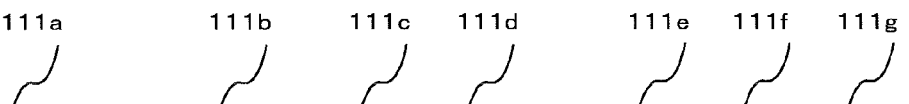
FIG. 3 is a table showing an example of a posted data DB.

FIG. 3 is a table showing an example of the posted data DB 111. The posted data DB 111 stores data such as a posted date/time in association with each piece of the posted data acquired by the posted data acquisition unit 101. The posted data DB 111 stores a date/time 111a, a poster ID 111b, a terminal 111c, a body 111d, a region 111e, a longitude 111f, and a latitude 111g.

The date/time 111a stores a date/time at which the posted data is posted. The poster ID 111b stores an ID identifying the poster. The poster ID 111b is, for example, a user name or an account name. The terminal 111c stores information indicating a type of the user-side terminal device 20 used to post the posted data. For example, the value "1" indicates the data posted from the PC, and the value "2" indicates the data posted from a mobile terminal such as a smartphone.

It is determined whether the data has been posted from the PC or the mobile terminal based on the information added to the posted data. For example, the type of the user-side terminal device 20 used for posting is identified with reference to information identifying whether or not an application used for the posting is dedicated to the mobile terminal.

The body 111*d* stores the body of the post of the posted data. The region 111*e* stores a posted place of the user-side terminal device 20. The posted place of the user-side terminal device 20 is, for example, the location of a router that has received the post from the user-side terminal device 20 in a wireless LAN. Further, for example, the posted place of the user-side terminal device 20 is identified from an IP address of the user-side terminal device 20 and from the location, management range, or the like of the internet service provider managing the user-side terminal device 20. Note that, the posted place is not always the information that can be acquired from the posted data, and when the posted place cannot be acquired, the region 111*e* does not store any value.

The longitude 111*f* and the latitude 111*g* store a latitude and a longitude of the posted place of the user-side terminal device 20, respectively, which are identified based on positional information such as a geotag added to the posted data. Note that, when the latitude and the longitude cannot be identified from the post, such as when a setting for adding the positional information to the post is not performed on the user-side terminal device 20, the longitude 111*f* and the latitude 111*g* does not store any value.

FIG. 4 is a table showing an example of the POI data DB 112. The POI data DB 112 stores the data such as the POI name and the category in association with each other for each POI. The POI data DB 112 is a database storing the POI data serving as the information relating to the POI registered by the service provider.

The POI data DB 112 stores a POI identifier 112*a*, a POI name 112*b*, a category 112*c*, a longitude 112*d*, a latitude 112*e*, an address 112*f*, a first value 112*g*, and a second value 112*h*.

The POI identifier 112*a* stores identification information identifying the POI. The POI name 112*b* stores the name of the POI. The POI name 112*b* stores, for example, the name "Restaurant ABC, ∘∘ Branch" or the name "XXX Hotel".

The category 112*c* stores information indicating the type of the POI. The category 112*c* stores, for example, information such as "tourist facility", "restaurant", and "hotel". The longitude 112*d* and the latitude 112*e* store the latitude and the longitude indicating the location of the POI, respectively. The address 112*f* stores the address of the POI.

The first value 112*g* and the second value 112*h* store numerical values indicating the number of characters used to determine whether or not the POI name is included in the posted data. For example, n1 and n2 are values identifying the number of characters counted from a head of the POI name.

Note that, when the first value 112*g* and the second value 112*h* both store values, "n1>n2" is established. Further, the values stored in the first value 112*g* and the second value 112*h* are not limited to the number of characters counted from the head of the POI name, and may be any value that allows calculation of a matching degree between the posted data and the POI name. For example, a value simply identifying the number of consecutive characters may be used instead of the value counted from the head.

Further, n1 or n2 may be uniformly determined for all the POIs. Further, n1 or n2 may be determined in accordance with the number of characters of each POI.

FIG. 5 is a table showing an example of the POI trend DB 113. The POI trend DB 113 stores information such as the trend rating for each POI.

The POI trend DB 113 stores a POI identifier 113*a*, a POI name 113*b*, a longitude 113*c*, a latitude 113*d*, and a trend rating 113*e*.

The POI identifier 113*a* is an ID identifying the POI, and corresponds to the POI identifier 112*a* of the POI data DB 112. The POI name 113*b* is the name of the POI, and corresponds to the POI name 112*b* of the POI data DB 112. The longitude 113*c* and the latitude 113*d* are the longitude and the latitude identifying the location of the POI, respectively, and correspond to the longitude 112*d* and the latitude 112*e* of the POI data DB 112, respectively.

The trend rating 113*e* stores a value indicating a degree to which the POI attracts attention. As the trend rating 113*e* becomes higher, the attention degree of the POI becomes higher. In other words, as the trend rating 113*e* becomes higher, the POI becomes more popular.

Figure 6:
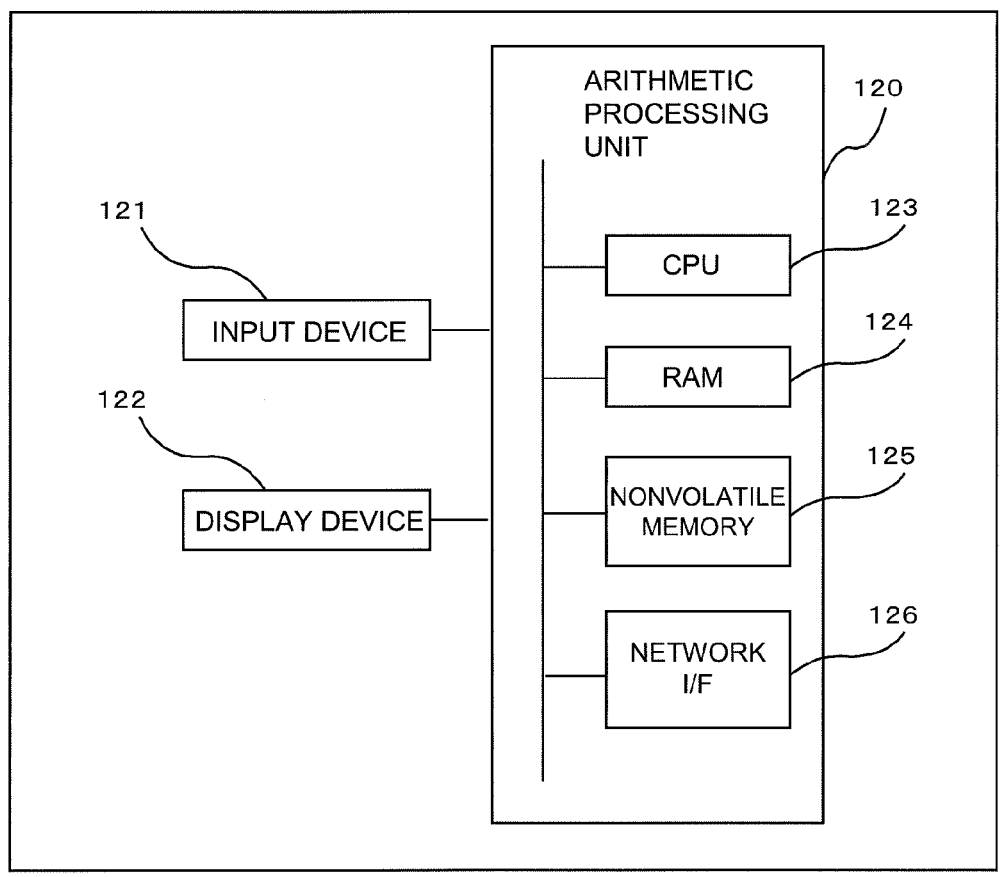
FIG. 6 is a diagram illustrating a hardware configuration example of a server device.

FIG. 6 is a diagram illustrating a hardware configuration example of the server device 10. The server device 10 includes an arithmetic processing unit 120, an input device 121, and a display device 122.

The input device 121 is a device which receives an input operation from the user, such as a touch panel and hardware buttons. The display device 122 is, for example, a display such as a liquid crystal display (LCD).

The arithmetic processing unit 120 is a central unit of the server device 10, and includes a central processing unit (CPU) 123, a RAM 124, a nonvolatile memory 125, and a network interface (I/F) 126. The respective components are connected to one another through a bus.

The CPU 123 is a central processing unit, and executes processing in accordance with a program stored in the RAM 124 or the nonvolatile memory 125. The RAM 124 is a memory, and functions as a storage area onto which the program and data are temporarily read. The nonvolatile memory 125 is a nonvolatile memory such as a flash memory, and is used as a storage destination of the program and various kinds of data. The network I/F 126 is an interface for connecting the server device 10 to the network 30.

On the server device 10, processing is performed by the CPU 123 operated in accordance with the program read onto the RAM 124 or the nonvolatile memory 125.

Figure 7:
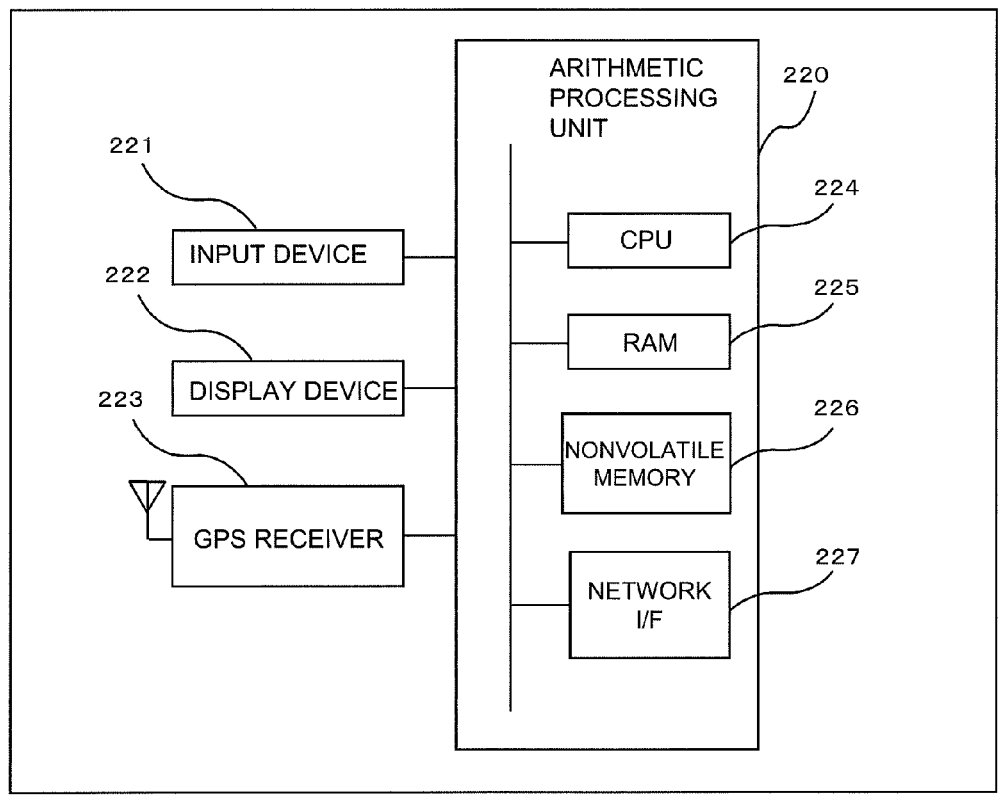
FIG. 7 is a diagram illustrating a hardware configuration example of the user-side terminal device.

FIG. 7 is a diagram illustrating a hardware configuration example of the user-side terminal device 20. The user-side terminal device 20 includes an arithmetic processing unit 220, an input device 221, a display device 222, and a GPS receiver 223. The arithmetic processing unit 220 includes a CPU 224, a RAM 225, a nonvolatile memory 226, and a network I/F 227. The arithmetic processing unit 220, the input device 221, and the display device 222 are the same as those of the server device 10, and hence descriptions thereof are omitted. Note that, the display screen controlled by the display unit 206 is displayed on the display device 222.

The GPS receiver 223 receives a signal transmitted from a satellite. The moving path search unit 201 identifies the present location of the user-side terminal device 20 based on the signal received by the GPS receiver 223.

Note that, processing of the respective components of the server device 10 and the user-side terminal device 20 may be executed by one piece of hardware, or may be executed by a plurality of pieces of hardware. Further, the processing of the respective components of the server device 10 and the user-side terminal device 20 may be realized by one program, or may be realized by a plurality of programs.

Next, a description is made of trend rating calculation processing performed by the server device 10.

Figure 8:
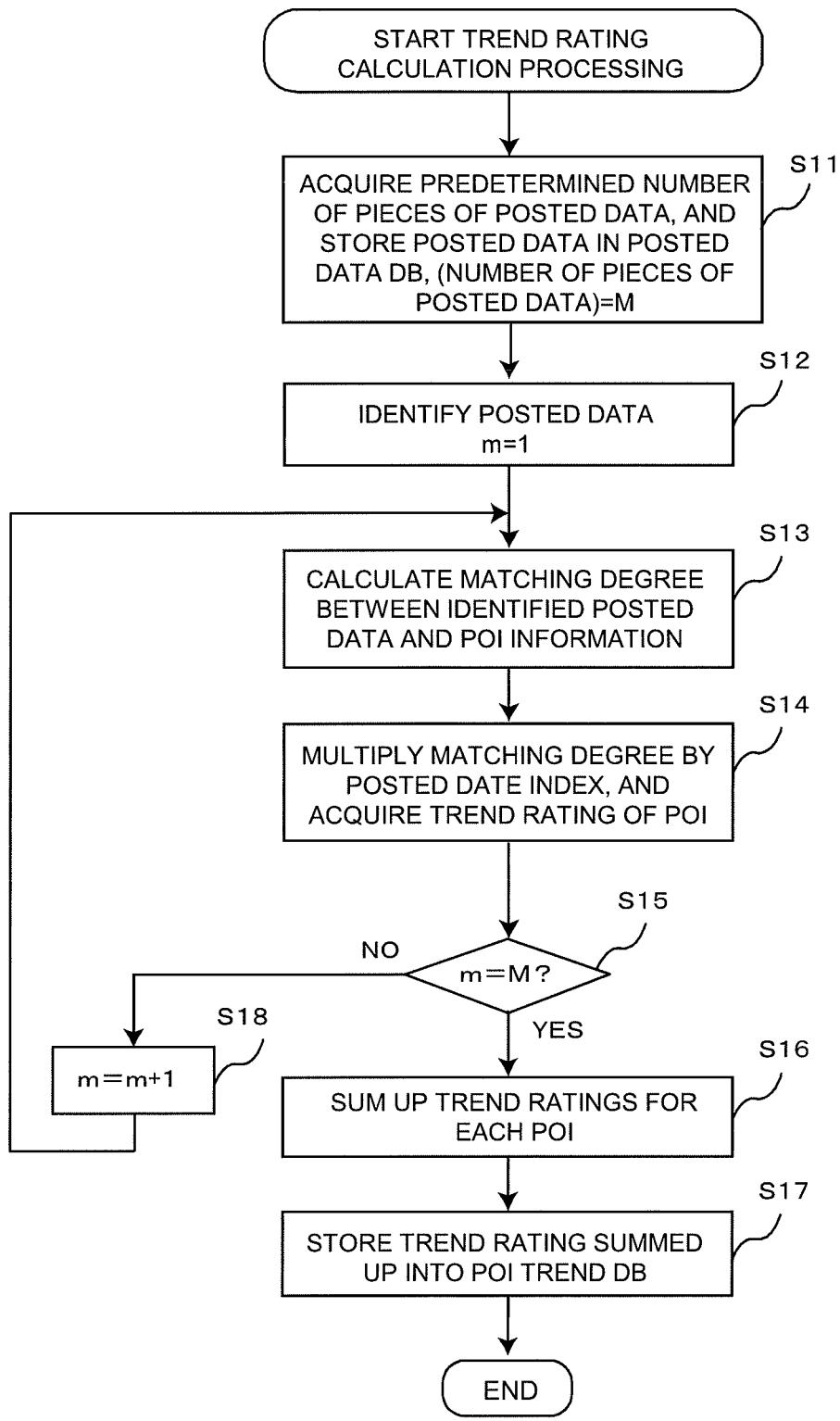
FIG. 8 is a flowchart illustrating an example of trend rating calculation processing.

FIG. 8 is a flowchart illustrating an example of the trend rating calculation processing. The server device 10 executes the following processing at regular intervals by, for example, a batch job.

The posted data acquisition unit 101 acquires a preset number of pieces of the posted data through the network 30, and stores the posted data in the posted data DB 111 (Step S11). In the following description, it is assumed that the number of pieces of the posted data stored in the posted data DB 111 is M.

Subsequently, the trend rating acquisition unit 102 identifies one piece of the posted data from among the stored posted data (Step S12). The description is made by taking the identified posted data as target posted data. In the following processing, the processing for calculating the trend rating is performed by setting each of the pieces of the posted data acquired by the posted data acquisition unit 101 as the target posted data in order. Therefore, the description is made by assuming the first piece of the target posted data as m=1.

Subsequently, the trend rating acquisition unit 102 calculates the matching degree between the target posted data and the POI information (Step S13). The trend rating acquisition unit 102 refers to the POI data DB 112 and the target posted data to calculate the matching degree between the target posted data and the POI based on whether or not the POI name is included in the posted data. The processing performed here is described later in detail.

Subsequently, the trend rating acquisition unit 102 multiplies the matching degree calculated in Step S13 by a posted date index, and acquires the trend rating for a pair of the target posted data and the POI (Step S14). The index is, for example, an reciprocal of the number of days that have elapsed since a posted date until a date of the processing. By multiplying the matching degree by the index defined so that the trend rating becomes higher as the posted date becomes newer, the trend rating is calculated to be higher for a "hotter" POI.

Note that, the index is multiplied here, but may be added. It suffices that, by adding the posted date index, the trend rating is calculated to be higher for the post having a smaller number of days that have elapsed since the posted date.

Subsequently, the trend rating acquisition unit 102 determines whether or not a number m indicating the place in order of a piece of the posted data that has been processed is equal to the total posted data count M stored in the posted data DB 111 (Step S15). When m does not match the total posted data count M ("NO" in Step S15), there is apiece of the posted data that has not been processed yet, and hence the trend rating acquisition unit 102 adds one to m (Step S18). After that, the trend rating acquisition unit 102 performs processing of Step S13 and Step S14 for the (m+1)th piece of the posted data as the next piece of the target posted data.

When the trend rating acquisition unit 102 determines that m is equal to the total posted data count M ("YES" in Step S15), the trend rating acquisition unit 102 advances the processing to Step S16.

Subsequently, the trend rating acquisition unit 102 sums up the trend ratings for each POI (Step S16). The trend rating acquisition unit 102 acquires the trend rating of the POI for each piece of the posted data included in the total posted data count M. The trend rating acquisition unit 102 sums up the trend ratings of the POI acquired from the pieces of the posted data for each POI.

A description is made of a case where, for example, the trend rating for "posted data A" and "POI 1" is "0.5", the trend rating for "posted data B" and "POI 2" is "0.75", and the trend rating for "posted data C" and "POI 1" is "0.3". In order to obtain the trend rating of "POI 1", the trend rating "0.5" acquired from "posted data A" and the trend rating "0.3" acquired from "posted data C" that are associated with "POI 1" are summed up. The trend rating of "POI 2" is only the trend rating "0.75" acquired from "posted data B", and hence this trend rating is set as the trend rating of "POI 2" without a change. Accordingly, the trend rating of "POI 1" is calculated as "0.8", and the trend rating of "POI 2" is calculated as "0.75".

Subsequently, the trend rating acquisition unit 102 stores the trend rating summed up for each POI into the trend rating 113e of the POI trend DB 113 (Step S17). The trend rating acquisition unit 102 brings the processing of this flowchart to an end.

Note that, the trend rating 113e of the POI trend DB 113 stores the value obtained by summing up the trend ratings of the POI acquired from the pieces of the posted data, but the value may be made to be relative. For example, the relative trend rating may be calculated by dividing the value obtained by summing up the trend ratings by the total posted data count M used for the calculation of the trend ratings, to be stored into the trend rating 113e. Further, for example, the relative trend rating may be calculated by dividing the value obtained by summing up the trend ratings by a maximum value N of the trend ratings. With this calculation, a ratio of each trend rating on the assumption that the maximum value N of the trend ratings is 1 is indicated by a numerical value ranging from 0 to 1.

In this embodiment, the matching degree between the POI and each piece of the posted data is calculated, and the trend ratings calculated based on the matching degrees are summed up for each POI, to thereby be able to acquire whether or not the POI is in fashion as an objective value.

Next, the matching degree calculation processing performed in Step S13 is described in more detail.

Figure 9:
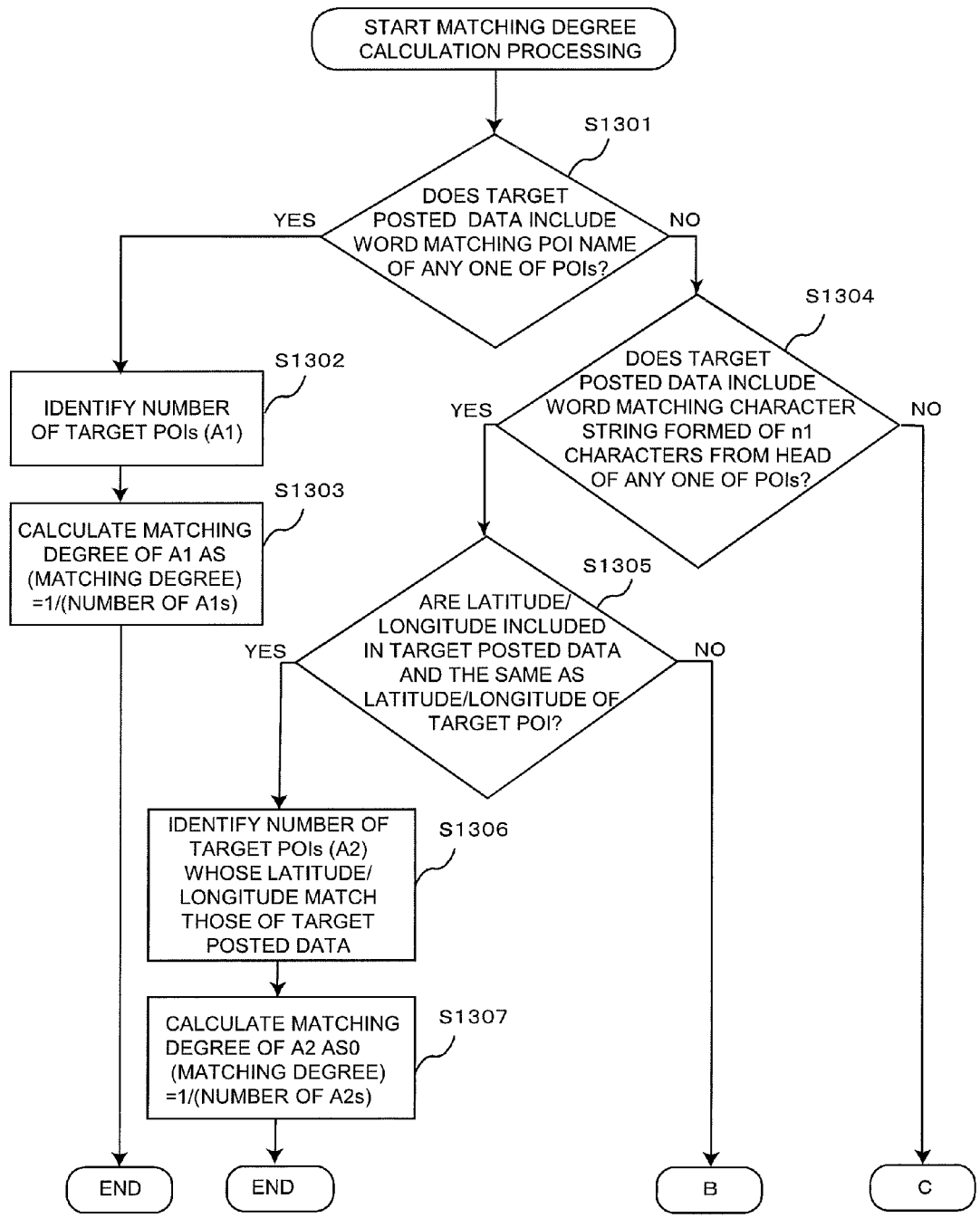
FIG. 9 is a flowchart (part 1) illustrating an example of matching degree calculation processing.

FIG. 9 is a flowchart (part 1) illustrating an example of the matching degree calculation processing.

The matching degree represents a value indicating the degree of a match between the posted data and a specific POI, and the matching degree is calculated for the pair of the posted data and the POI. As the matching degree becomes higher, it is more probable that a reference made in the posted data is the reference to the POI forming the pair.

The trend rating acquisition unit 102 determines whether or not the target posted data includes a word matching the POI name of anyone of the POIs (Step S1301). Specifically, the trend rating acquisition unit 102 refers to the POI name 112b of the POI data DB 112 to determine whether or not a character string forming the POI name is included in the target posted data for each individual POI.

When the trend rating acquisition unit 102 determines that the target posted data includes a word matching the POI name of any one of the POIs ("YES" in Step S1301), the trend rating acquisition unit 102 identifies the POI relating to the POI name matched by the word as a target POI, and identifies the number of target POIs (Step S1302). Here, the target POI is set as A1.

Note that, when the target posted data includes a plurality of POIs (target POIs) relating to the POI name matched by the word, the trend rating acquisition unit 102 identifies each of the POIs matched by the word as the target POI in order, and executes the processing therefor.

Subsequently, the trend rating acquisition unit 102 calculates the matching degree of A1 as "(matching degree)=1/(number of A1s)" (Step S1303). The trend rating acquisition unit 102 stores the calculated matching degree into a buffer in association with each target POI included in A1, and brings the processing of this flowchart to an end.

When the trend rating acquisition unit 102 does not determine that the target posted data includes a word matching the POI name of any one of the POIs ("NO" in Step S1301), the trend rating acquisition unit 102 determines whether or not the target posted data includes a word matching the character string formed of n1 characters from the head of any one of the POIs (Step S1304). Specifically, the trend rating acquisition unit 102 refers to the POI name 112b and the first value 112g of the POI data DB 112 to determine whether or not the character string formed of n1 consecutive characters from the head is included in the target posted data for each individual POI.

Here, FIG. 4 is referred to. The first value 112g of a record 112y is 6, and hence it is determined for the POI name 112b "AAABBB" whether or not the target posted data includes the character string formed of six consecutive characters from the head, that is, "AAABBB". In the same manner, the POI name 112b of a record 112z is "BBBCCC" with the first value 112g being 4, and hence it is determined whether or not the target posted data includes the character string "BBBC" formed of four consecutive characters from the head. This processing is executed for all the POIs included in the POI data DB 112.

When the trend rating acquisition unit 102 determines that the target posted data includes a word matching n1 of any one of the POIs ("YES" in Step S1304), the trend rating acquisition unit 102 identifies the POI matched by the word as the target POI. The trend rating acquisition unit 102 determines whether or not the latitude/longitude indicating the posted place are added to the matched piece of the target posted data and the latitude/longitude are the same as the latitude/longitude of the target POI (Step S1305). The trend rating acquisition unit 102 refers to the POI data DB 112 by using the latitude/longitude of the target posted data, to determine whether or not the longitude 112d and the latitude 112e of the target POI are matched.

Note that, when the target posted data includes a plurality of POI names matched by the word, the trend rating acquisition unit 102 identifies each of the POIs matched by the word as the target POI in order, and executes the processing therefor, which is the same as the above-mentioned case.

The case where the latitude/longitude are added to the target posted data and the latitude/longitude are the same as the latitude/longitude of the target POI means that the user has posted the target posted data around the target POI. The target posted data includes at least a part of the POI name of the target POI, and hence the match between the posted position and the position of the target POI makes it conceivable that the target posted data is likely to include the reference to the target POI.

Note that, the case where the latitude/longitude are matched does not necessarily mean that the numerical values are the same. For example, even when a difference between the numerical values falls within a predetermined range (for example, ±3 seconds), the latitude/longitude are assumed to be matched.

When the trend rating acquisition unit 102 determines that the target posted data includes the latitude/longitude and the latitude/longitude of the target posted data are the same as the latitude/longitude of the target POI ("YES" in Step S1305), the trend rating acquisition unit 102 identifies the number of target POIs whose latitude/longitude match those of the target posted data (Step S1306). Here, it is assumed that the target POI whose position matches the latitude/longitude of the target posted data is A2.

Subsequently, the trend rating acquisition unit 102 calculates the matching degree of A2 as "(matching degree)=1/(number of A2s)" (Step S1307). The trend rating acquisition unit 102 stores the calculated matching degree into the buffer in association with each target POI included in A2, and brings the processing of this flowchart to an end.

When the trend rating acquisition unit 102 does not determine in Step S1305 that the target posted data includes the latitude/longitude and the latitude/longitude included in the target posted data are the same as the latitude/longitude of the target POI ("NO" in Step S1305), the processing advances to Step S1308.

Figure 10:
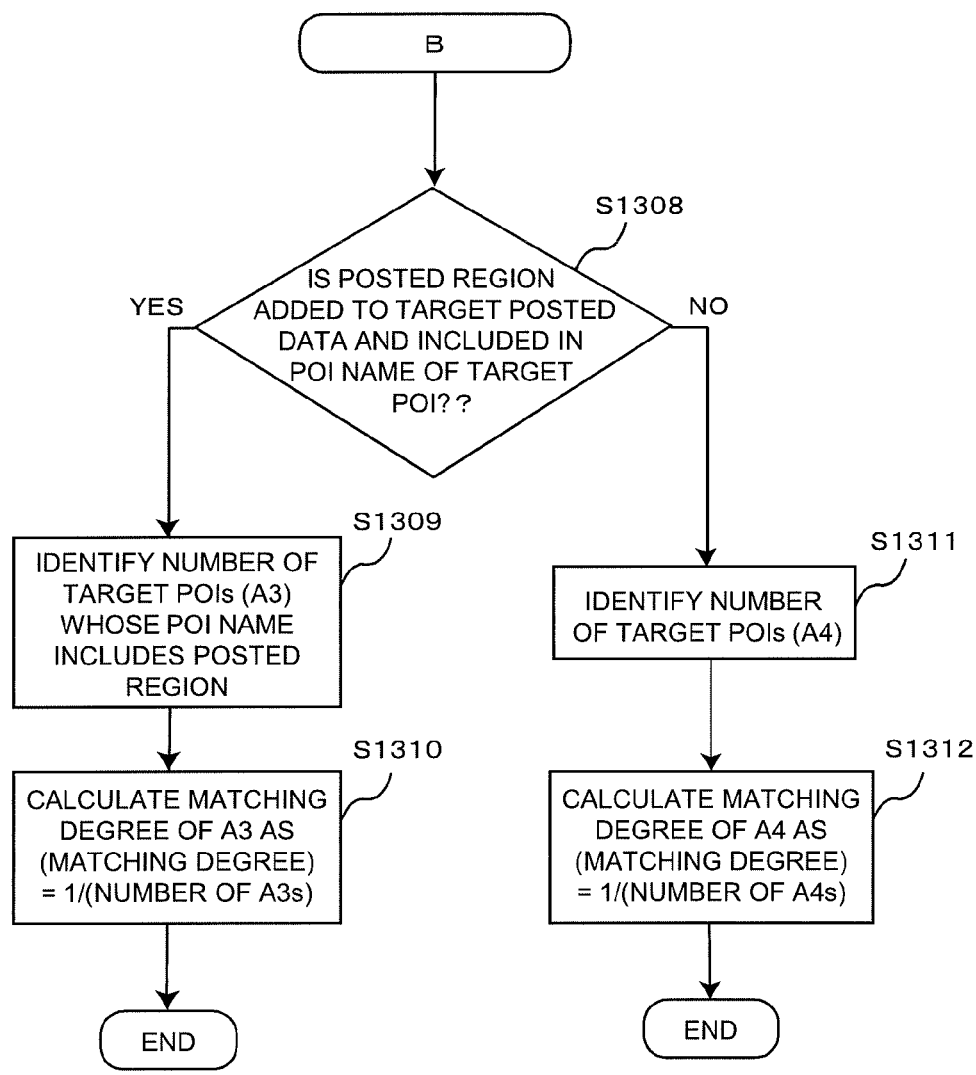
FIG. 10 is a flowchart (part 2) illustrating an example of the matching degree calculation processing.

FIG. 10 is a flowchart (part 2) illustrating an example of the matching degree calculation processing.

The trend rating acquisition unit 102 determines whether or not the information identifying a posted region is added to the target posted data and the POI name of the target POI includes the posted region (Step S1308).

Specifically, the trend rating acquisition unit 102 refers to the region 111e of the posted data DB 111 to identify the posted region of the target posted data. The trend rating acquisition unit 102 refers to the POI name 112b of the POI data DB 112 by using the identified posted region, to determine whether or not the POI name of the target POI includes the posted region. For example, when the posted region of the target posted data is "Yokohama City" with the POI name of the target POI being "Bistro OO, Yokohama Branch", the trend rating acquisition unit 102 determines that the posted region of the target posted data is included in the POI name of the target POI.

When the trend rating acquisition unit 102 determines that the information identifying the posted region is added to the target posted data and the POI name of the target POI includes the posted region ("YES" in Step S1308), the trend rating acquisition unit 102 identifies the number of target POIs that include the posted region (Step S1309). Here, it is assumed that the target POI including the posted region of the target posted data is A3.

Subsequently, the trend rating acquisition unit 102 calculates the matching degree of A3 as "(matching degree)=1/(number of A3s)" (Step S1310). The trend rating acquisition unit 102 stores the calculated matching degree into the buffer in association with each target POI included in A3, and brings the processing of this flowchart to an end.

When it is not determined in Step S1308 that the information identifying the posted region is added to the target posted data and the POI name of the target POI includes the posted region ("NO" in Step S1308), the trend rating acquisition unit 102 identifies the number of target POIs (Step S1311). Here, it is assumed that the target POI, that is, the POI whose character string formed of n1 characters from the head of the POI name is included in the target posted data, is A4.

Next, the trend rating acquisition unit 102 calculates the matching degree of A4 as "(matching degree)=1/(number of A4s)" (Step S1312). The trend rating acquisition unit 102 stores the calculated matching degree into the buffer in association with each target POI included in A4, and brings the processing of this flowchart to an end.

The description is continued by returning to FIG. 9. When the trend rating acquisition unit 102 does not determine in Step S1304 that the target posted data includes a word matching the character string formed of n1 consecutive characters from the head of any one of the POIs stored in the POI data DB 112 ("NO" in Step S1304), the processing advances to Step S1313.

Figure 11:
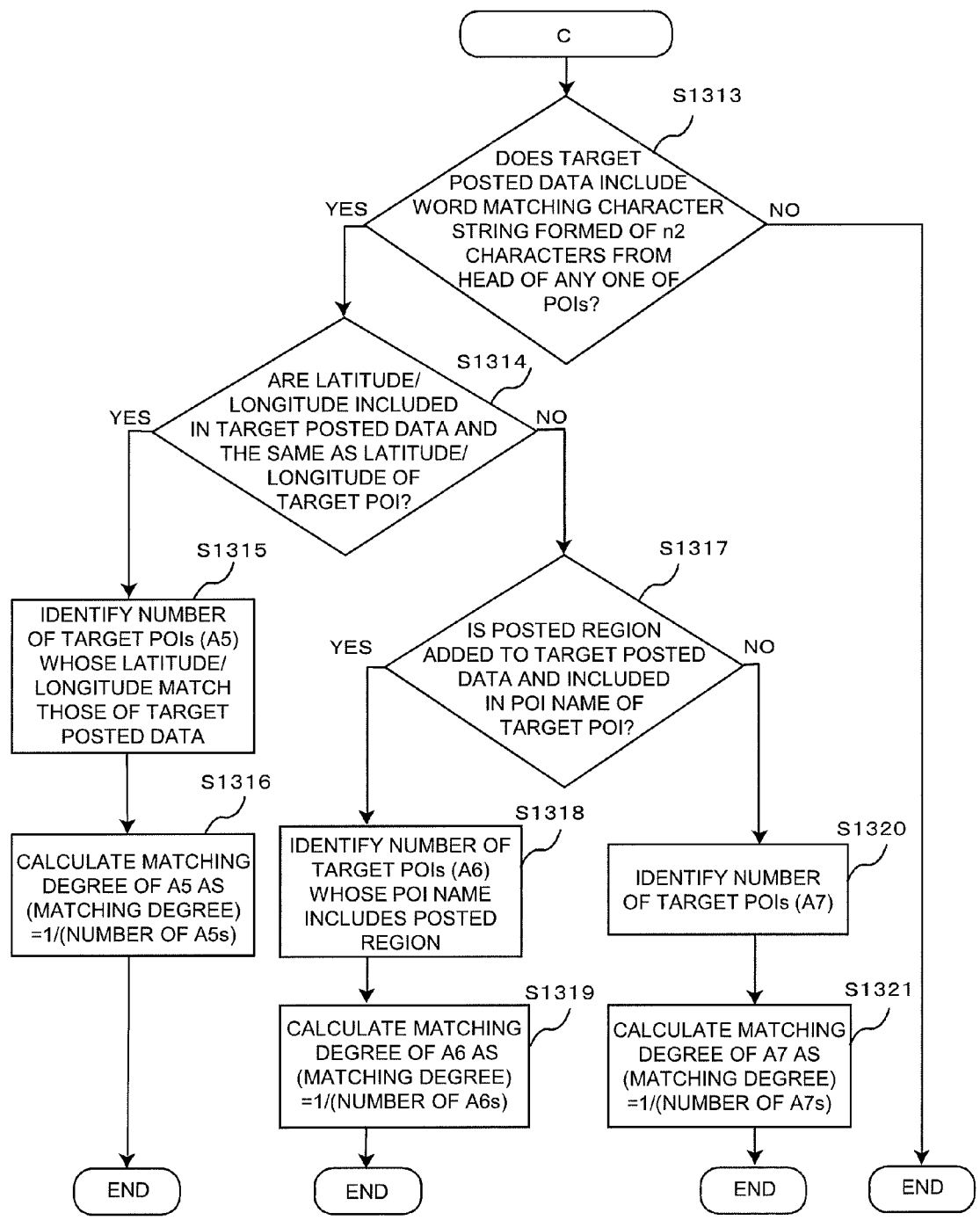
FIG. 11 is a flowchart (part 3) illustrating an example of the matching degree calculation processing.

FIG. 11 is a flowchart (part 3) illustrating an example of the matching degree calculation processing.

The trend rating acquisition unit 102 determines whether or not the target posted data includes a word matching the character string formed of n2 consecutive characters from the head of any one of the POIs stored in the POI data DB 112 (Step S1313). When the trend rating acquisition unit 102 does not determine that the target posted data includes a word matching the character string formed of n2 consecutive characters from the head of any one of the POIs ("NO" in Step S1313), the trend rating acquisition unit 102 brings the processing of this flowchart to an end.

When the trend rating acquisition unit 102 determines that the target posted data includes a word matching the character string formed of n2 consecutive characters from the head of any one of the POIs ("YES" in Step S1313), the trend rating acquisition unit 102 identifies at least one POI matched by the word as the target POI. The trend rating acquisition unit 102 determines whether or not the latitude/longitude indicating the posted place are added to the matched piece of the target posted data and the latitude/longitude of the target posted data are the same as the latitude/longitude of the target POI (Step S1314).

The processing performed in Step S1314 to Step S1321 is the same as the processing performed in Step S1305 to Step S1312, and hence a description thereof is omitted. The trend rating acquisition unit 102 calculates the matching degree between the target posted data and the target POI, and stores the matching degree into the buffer in association with the information identifying the target POI.

In this embodiment, the matching degree relating to each piece of the posted data is calculated for each target POI. As described above, the trend rating is calculated based on the calculated matching degree, and the trend ratings calculated for the same POI are summed up. Whether or not the POI is a hot topic on the Internet can be used as one of criteria for determination as to whether or not the POI is in fashion, and hence by summing up the trend ratings calculated based on the word included in the posted data for each POI, it is possible to acquire an objective index indicating whether or not the POI is in fashion.

Figure 12:
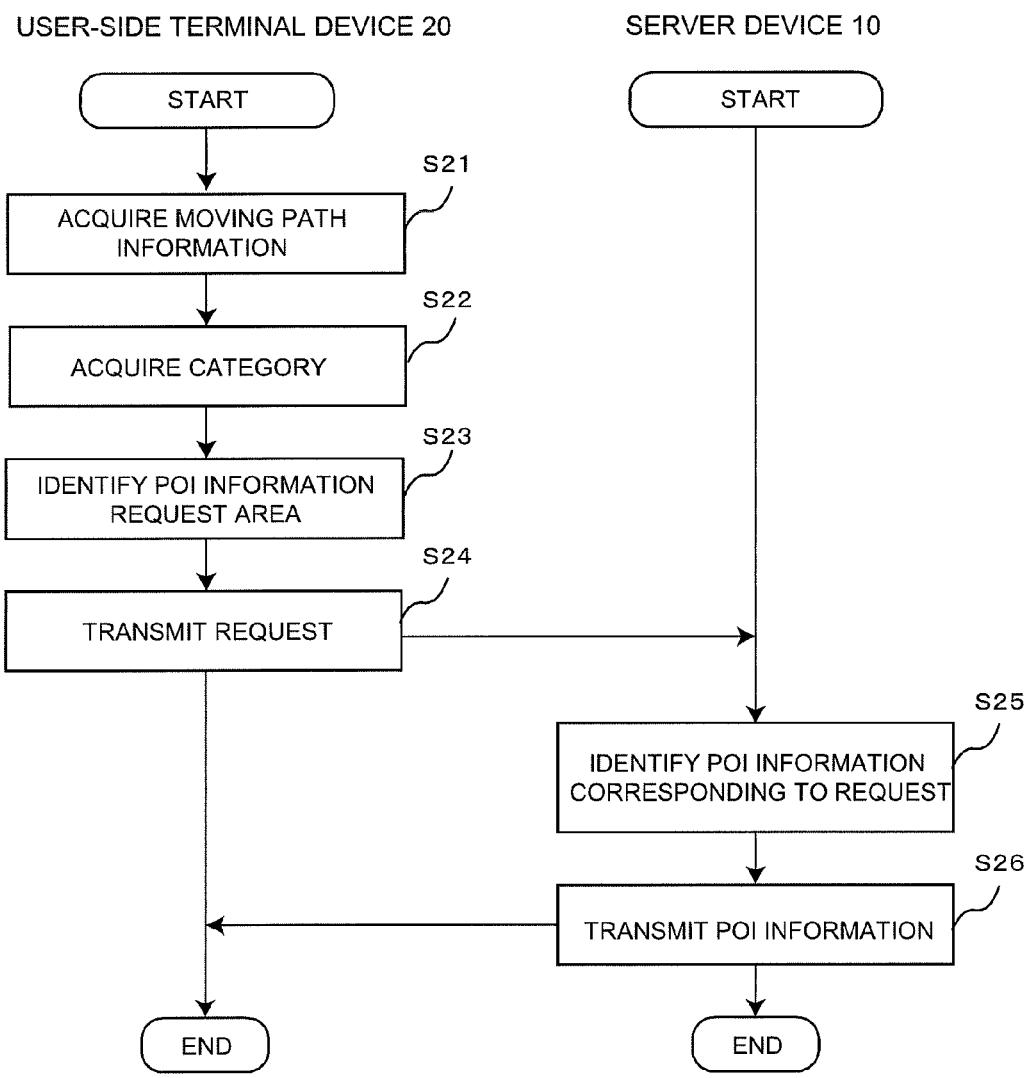
FIG. 12 is a sequence diagram illustrating a flow of POI information providing processing.

FIG. 12 is a sequence diagram illustrating a flow of POI information providing processing.

First, the moving path search unit 201 of the user-side terminal device 20 acquires moving path information (Step S21). Specifically, the moving path search unit 201 receives inputs of the present location or the departure location and the arrival location, and acquires information identifying a path from the present location or the departure location to the arrival location.

Subsequently, the request creation unit 202 acquires the category of the POI to be requested (Step S22). The category is information indicating the type of the POI, and the request creation unit 202 acquires the category by, for example, receiving a selection of the category of the POI to be requested from among a plurality of categories. For example, the request creation unit 202 acquires the information identifying the category "restaurant" of the POI to be requested.

Subsequently, the request creation unit 202 identifies a POI information request area (Step S23). Specifically, an area within a predetermined distance from the moving path acquired in Step S21 is identified as the POI information request area.

Subsequently, the request transmission unit 203 transmits a request for requesting the POI information to the server device 10 (Step S24). The POI information represents information including the POI data serving as the information relating to the POI and the trend rating of the POI. The request includes the category of the POI identified in Step S22 and the POI information request area identified in Step S23.

Subsequently, the POI information identification unit 103 of the server device 10 refers to the request transmitted from the user-side terminal device 20 to identify the POI information corresponding to the request (Step S25). Specifically, the POI information identification unit 103 refers to the category 112c and the address 112f of the POI data DB 112, to identify the POI whose address 112f exists within the POI information request area included in the request and whose category 112c corresponds to the category included in the request. The POI information identification unit 103 refers to the POI trend DB 113 by using the POI identifier 112a of the identified POI, to identify the trend rating 113e corresponding to the matched POI identifier 113a.

Subsequently, the response transmission unit 105 transmits the response including the POI information obtained by associating the POI data included in the POI data DB 112 with the trend rating for the POI identified by the POI information identification unit 103 (Step S26). The user-side terminal device 20 and the server device 10 bring the processing of this sequence to an end.

Next, a description is made of POI information displaying processing performed on the user-side terminal device 20. The map information updated in accordance with the movement of the user-side terminal device 20 is displayed on the display device 222 of the user-side terminal device 20. The POI information is displayed on the map information along with the present location of the user-side terminal device 20 and the moving path to the arrival location.

Figure 13:
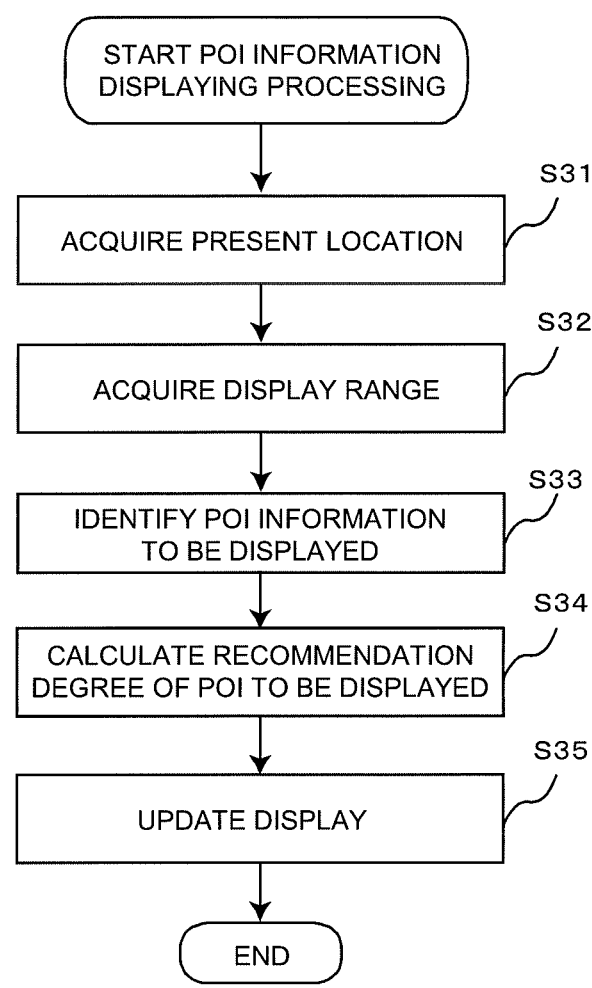
FIG. 13 is a flowchart illustrating an example of POI information displaying processing.

FIG. 13 is a flowchart illustrating an example of the POI information displaying processing. The user-side terminal device 20 acquires the POI information from the server device 10 in advance.

The moving path search unit 201 uses the GPS receiver 223 to acquire the present location of the user-side terminal device 20 (Step S31).

Subsequently, the POI trend identification unit 204 acquires a display range of the map information on the display device 222 from the display unit 206 (Step S32). The display unit 206 controls an area within a predetermined range from the user-side terminal device 20 to be displayed as the map information. The POI trend identification unit 204 acquires the display range of the map information.

Subsequently, the POI trend identification unit 204 identifies the POI information on the POI to be displayed (Step S33). Specifically, the POI trend identification unit 204 identifies, from among pieces of the POI information acquired from the server device 10, the POI that is located within the display range acquired in Step S32 and is closer to the arrival location than the present location of the user-side terminal device 20 acquired in Step S31.

Subsequently, the POI recommendation degree calculation unit 205 calculates the recommendation degree of the POI based on the trend rating associated with the identified POI (Step S34). Specifically, the POI recommendation degree calculation unit 205 calculates the recommendation degree of the POI by multiplying the trend rating by a distance index corresponding to a distance between the location of the POI and the user-side terminal device 20. The larger distance index is set for the shorter distance between the location of the POI and the user-side terminal device 20. Accordingly, the POI closer to the moving path has a higher recommendation degree even among a plurality of POIs having the same trend rating.

Note that, the POI recommendation degree calculation unit 205 may simplify the calculated recommendation degree by scaling or the like. For example, the recommendation degree may be simplified by performing evaluation stepwise based on the value of the recommendation degree, for example, the evaluation is rated as "1" for the recommendation degree "equal to or higher than 0 and lower than 10" and the evaluation is rated as "2" for the recommendation degree "equal to or higher than 10 and lower than 11".

Subsequently, the display unit 206 updates the display screen of the display device 222 (Step S35). The display unit 206 brings the processing of this flowchart to an end.

Figure 14:
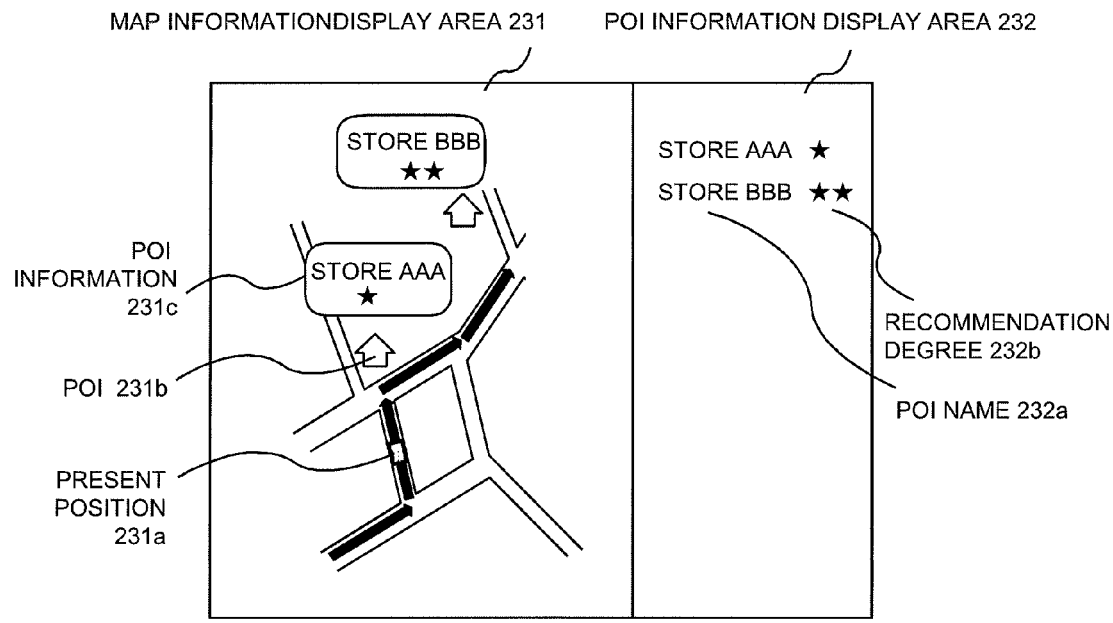
FIGS. 14A and 14B are diagrams illustrating an example of a POI information display screen.
Figure 14:
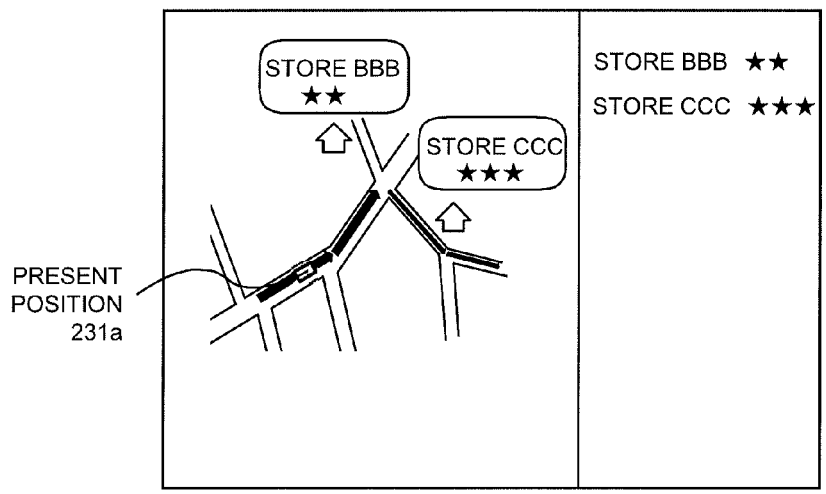

FIGS. 14A and 14B are diagrams illustrating an example of a POI information display screen 230. The POI information display screen 230 includes a map information display area 231 and a POI information display area 232.

The map information including the moving path within a predetermined distance from a present position of the user-side terminal device 20 is displayed in the map information display area 231. A present position 231a of the user-side terminal device 20 and a POI 231b within the predetermined distance from the present position and closer to the arrival location than the present position are displayed in the map information. Further, POI information 231c indicating the name of the POI and the recommendation degree of the POI are displayed in the map information display area 231. The display unit 206 displays the POI 231b in a predetermined position on a map based on the address or the like of POI included in the POI information acquired from the server device 10.

A POI name 232a serving as the name of the POI displayed in the map information display area 231 and a recommendation degree 232b of the POI are displayed in the POI information display area 232.

On the POI information display screen 230 of FIG. 14(a), "Store AAA" and "Store BBB", each of which is the POI 231b closer to the arrival location than the present position 231a, are displayed. In accordance with the movement of the user-side terminal device 20, the POI information display screen 230 transitions to the screen of FIG. 14(b).

After the movement, the user-side terminal device 20 has passed through "Store AAA", and hence the POI trend identification unit 204 excludes the POI "Store AAA" from the POIs to be displayed. On the other hand, the POI "Store CCC" exists within a new display range of the map information, and hence the POI trend identification unit 204 identifies the POI "Store CCC" as the POI to be displayed. The display unit 206 displays the POI "Store CCC" and the recommendation degree on the POI information display screen 230.

According to this embodiment, the recommendation degree of the POI can be acquired by using the trend rating objectively calculated based on a posted data count. Further, displaying the information relating to the POI in the map information updated in accordance with the movement of the user-side terminal device 20 allows the user to easily recognize a POI at a moving destination and whether or not and to what extent the POI is in fashion.

First Modification Example

Next, a description is made of a first modification example of the POI information providing system 1. In the above-mentioned embodiment, the matching degree between the posted data and the POI is calculated irrespective of how the POI included in the posted data is evaluated. In the first modification example, when a negative evaluation of the POI is included in the posted data, the matching degree is calculated in a different manner from another piece of the posted data. Points different from the above-mentioned embodiment are mainly described below, and descriptions of the same points are omitted.

The storage unit 110 of the server device 10 prestores a negative word that can be included in the posted data. The negative word represents a word such as "bad", "unpalatable", and "filthy", and is a wording based on which it is assumed that the POI is negatively evaluated when the wording is used along with the POI name.

In the matching degree calculation processing illustrated in FIG. 9, the trend rating acquisition unit 102 performs the comparison between the target posted data and the POI name, and in this case, the trend rating acquisition unit 102 identifies whether or not the negative word is included in the target posted data. When the negative word is included, the trend rating acquisition unit 102 multiplies the matching degree calculated for the pair of the target posted data and the POI by a posting index X (X=−1). Accordingly, the matching degree between the target posted data including the negative word and the POI and the trend rating are negative numbers. Note that, X may have a value of zero.

The calculated trend ratings are summed up for each POI, and as the trend rating of the POI acquired from the target posted data including the negative evaluation becomes lower, the value obtained by summing up the trend ratings becomes lower accordingly. In this modification example, by using the posting index corresponding to posted contents of the posted data to calculate the matching degree, it is possible to acquire the trend rating corresponding to a reputation of the POI.

Second Modification Example

Next, a description is made of a second modification example of the POI information providing system 1. In the second modification example, the matching degree is calculated in a different manner depending on the kind of the user-side terminal device 20 from which the posted data has been posted.

In the matching degree calculation processing illustrated in FIG. 9, the trend rating acquisition unit 102 identifies the terminal 111c corresponding to the target posted data when calculating the matching degree between the target posted data and the POI, and multiplies the matching degree by a terminal index corresponding to the terminal 111c. The terminal index is set higher when the terminal is other than a PC than when the terminal is the PC. For example, when the terminal is other than the PC, the terminal index is 10, and when the terminal is the PC, the terminal index is 1.

When the terminal is other than the PC, it is conceivable that the user is performing posting from a place other than his/her home, for example, the moving destination. When the terminal is other than the PC and when the posted data includes the information indicating the latitude/longitude or the region, it is more probable that the user is performing posting from around the POI than when the posting is performed from the PC, and it is conceivable that the target posted data is likely to include the reference to the target POI. Accordingly, when the terminal is other than the PC, the matching degree is multiplied by the posting index higher than when the terminal is the PC, to calculate a high trend rating.

In this modification example, by multiplying the matching degree by the terminal index corresponding to the type of the user-side terminal device 20 from which the posted data has been posted, it is possible to acquire the trend rating having a higher accuracy.

Third Modification Example

Next, a description is made of a third modification example. In the third modification example, a keyword is set for each POI. In the case where the matching degree is calculated by comparing the target posted data with the POI name, when the target posted data includes the keyword corresponding to the POI, the increased matching degree is calculated.

FIG. 15 is a table showing an example of a POI data DB 112A according to a second embodiment of the present invention. Descriptions of the same points as the POI data DB 112 of FIG. 4 are omitted.

The POI data DB 112A includes metadata 112$i$. The metadata 112$i$ stores the keyword associated with each POI, which can be used as an index indicating whether or not the POI is in fashion. For example, when "Okinawan cuisine" is in fashion, information identifying "Okinawa" is stored in the metadata 112$i$ on the POI of an eating house. In the same manner, when "footbath" provided to a tourist facility is in fashion, information identifying "footbath" is stored in the metadata 112$i$ on the tourist facility.

In the matching degree calculation processing illustrated in FIG. 9, the trend rating acquisition unit 102 performs the comparison between the target posted data and the POI name, and the entirely or partially matched POI is handled as the target POI, to calculate the matching degree. The trend rating acquisition unit 102 refers to the POI data DB 112A for the target POI, to determine whether or not the keyword included in the metadata 112$i$ on the target POI is included in the target posted data. When the keyword included in the metadata 112$i$ on the target POI is included in the target posted data, the trend rating acquisition unit 102 adds a metadata index corresponding to the number of keywords included in the target posted data to the matching degree.

Note that, the keyword stored in the metadata 112$i$ can be included in the POI information included in the response transmitted to the user-side terminal device 20 by the server device 10. The user-side terminal device 20 that has acquired the POI information may display the keyword along with the POI information when displaying the POI information on the display unit 206.

According to this modification example, when the posted data includes the reference to the POI, and when the posted data includes the keyword being in fashion, the higher matching degree is calculated. In other words, the trend rating of the POI is calculated in accordance with the trend at that time. Accordingly, by referring to the POI information displayed on the user terminal device, the user can recognize the degree to which the POI is in fashion. Further, by displaying the keyword on the POI information display screen 230, the user can recognize a relation between the POI and the keyword being in fashion.

Fourth Modification Example

Next, a description is made of a fourth modification example. In the fourth modification example, the user-side terminal device 20 holds a movement history in a storage unit (not shown). The user-side terminal device 20 identifies the POI information request area in accordance with the present location and the movement history, and transmits the POI information request area after including the POI information request area in the request to be transmitted to the server device 10.

Figure 16:
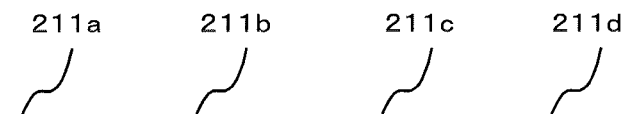
FIG. 16 is a table showing an example of a movement history DB.

FIG. 16 is a table showing an example of a movement history DB 211. The movement history DB 211 includes a road ID 211$a$, a moving direction 211$b$, a movement count 211$c$, and a location 211$d$.

The road ID 211$a$ stores identification information identifying a road along which the user-side terminal device 20 moves. The moving direction 211$b$ stores information identifying a direction in which the user-side terminal device 20 moves. The moving direction 211$b$ stores, for example, "0" in a case of moving toward the north and "1" in a case of moving toward the south.

The movement count 211$c$ stores a numerical value indicating a movement count for which the user-side terminal device 20 has moved. The location 211$d$ stores the location of the road identified by the road ID 211$a$.

In the POI information providing processing illustrated in FIG. 12, the request creation unit 202 of the user-side terminal device 20 identifies an area within a predetermined distance from the moving path acquired based on the present location or the departure location and the arrival location, as the POI information request area. In this modification example, the request creation unit 202 uses the GPS receiver 223 to acquire the present location, and refers to the location 211$d$ of the movement history DB 211 by using the acquired present location, to identify the road ID 211$a$ of at least one of the plurality of roads including the present location. The request creation unit 202 identifies the road ID 211$a$ of the road exhibiting the largest movement count 211$c$ from among the identified road IDs 211$a$. The request creation unit 202 identifies an area within a predetermined distance from the identified road ID 211$a$, as the POI information request area.

After that, the request transmission unit 203 transmits the request including the information identifying the POI information request area to the server device 10, which is the same as the above-mentioned embodiment.

Note that, the movement history DB 211 may store information identifying a road to be coupled to in association with the road ID 211$a$. The request creation unit 202 may acquire a predicted moving path by identifying the road ID 211$a$ of the road exhibiting the largest movement count 211$c$ from among the road IDs 211$a$ including the present location and repeatedly identifying the road exhibiting a large travel count which is coupled toward the moving direction 211$b$ of the identified road. In this case, an area within a predetermined distance from the predicted moving path is identified as the POI information request area.

According to this modification example, it is possible to omit the processing for searching for the moving path by receiving an input of the arrival location or the like on the user-side terminal device 20. The moving path having a large count of history of movement from the present location is acquired to display the POI information, which can eliminate time and labor for the user to input the information for searching for the moving path.

The respective embodiments and the respective modification examples according to the present invention have been described above, but the present invention is not limited to the examples of the above-mentioned embodiments, and various modification examples are included therein. For example, the examples of the above-mentioned embodiments have been described in detail in order to clearly describe the present invention, and the present invention is not limited to the configuration including all the components described above. Further, a part of the configuration of an example of a given embodiment can replace the configuration of another example. Further, the configuration of another example can also be added to the configuration of an example of a given embodiment. Further, another configuration can be added to, deleted from, or replace a part of the configuration of each of the embodiments. Further, in regard to each of the above-mentioned configurations, components, functions, processing units, processing means, and the like, a part thereof or an entirety thereof may be realized by hardware, for example, by being designed as an integrated circuit. Further, control lines and information lines that are assumed to be necessary for the sake of description are illustrated in the drawings, but not all thereof are illustrated. It may also be considered that almost all the components are connected to one another.

Further, the above-mentioned functional configuration of the server device 10 or the user-side terminal device 20 is classified in accordance with main processing contents in order to facilitate the understanding. The present invention is not limited to the classification methods or names of the components. The configuration of the server device 10 or the user-side terminal device 20 can also be classified into a larger number of components in accordance with the processing contents. Further, the classification may be performed so that one component executes more processings.

For example, on the user-side terminal device 20, the range within a predetermined distance from the moving path is identified as the POI information request area, but a range within a predetermined distance from the present location may be identified as the POI information request area. When the movement is not assumed on the user-side terminal device 20, it is possible to display the POI within a predetermined range from the present location.

Further, the moving path search unit 201 of the user-side terminal device 20 searches for the moving path, but the server device 10 may search for the moving path. For example, the server device 10 may identify the moving path by transmitting the present location of the user-side terminal device 20 and the arrival location to the server device 10.

In the same manner, the POI recommendation degree calculation unit 205 of the user-side terminal device 20 calculates the recommendation degree based on the moving path and the trend rating calculated by the server device 10, but the server device 10 may calculate the recommendation degree. For example, by transmitting the moving path and the information relating to the display range of the user-side terminal device 20 to the server device 10, the server device 10 may identify the POI to be displayed and calculate the recommendation degree based on the moving path.

What is claimed is:

1. A POI information providing device, comprising:
a storage unit which stores POI data comprising a POI name;
a posted data acquisition unit which acquires posted data through a network;
a trend rating acquisition unit which obtains a matching degree by matching consecutive characters between a word comprised in the posted data and the POI name for each piece of the posted data based on whether the POI name is included in the posted data, and uses a predetermined calculation expression for the matching degree to calculate and acquire a trend rating indicating a trend in popularity of a POI;
a trend rating identification unit which identifies, when a request for the trend rating is received from another device connected through the network, the trend rating corresponding to the request; and
a transmission unit which transmits the trend rating identified by the trend rating identification unit to the another device.

2. A POI information providing device according to claim 1, wherein:
the POI data has positional information on the POI corresponding to the POI name; and
the trend rating identification unit identifies, based on the request, the trend rating of the POI existing within a predetermined distance from a moving path of the another device.

3. A POI information providing device according to claim 1, wherein the trend rating acquisition unit identifies, based on a number of the POIs relating to the posted data and whether or not a posted location of the posted data and a location of the POI match each other, the trend rating by using a value obtained by summing up the matching degree obtained for each piece of the posted data for each of the POIs relating to the posted data.

4. A POI information providing device according to claim 1 wherein the trend rating acquisition unit is configured to perform one of multiplication and addition of the trend rating by and to an index defined based on date and time at which the posted data is posted.

5. A POI information providing device according to claim 1, wherein:
the POI data has a keyword corresponding to the POI name; and
the trend rating acquisition unit is configured to perform one of addition and multiplication of the trend rating to and by a predetermined value in accordance with a number of the keywords comprised in the posted data.

6. A POI information providing system, comprising:
a mobile terminal; and
a POI information providing device which provides the mobile terminal with information relating to a POI,
the mobile terminal and the POI information providing device being connected to each other through a network,
the POI information providing device comprising:
a storage unit which stores POI data comprising a POI name;
a posted data acquisition unit which acquires posted data through the network;
a trend rating acquisition unit which obtains a matching degree by matching consecutive characters between a word comprised in the posted data and the POI name for each piece of the posted data based on whether the POI name is included in the posted data, and uses a predetermined calculation expression for the matching degree to calculate and acquire a trend rating indicating a trend in popularity of the POI; and
a trend rating identification unit which identifies, when a request for the trend rating is received from the mobile terminal, the trend rating corresponding to the request,
the mobile terminal comprising a recommendation degree output unit which outputs a recommendation degree calculated based on the trend rating identified by the trend rating identification unit.

7. A POI information providing system according to claim 6, wherein:
the POI data stored in the storage unit has positional information on the POI corresponding to the POI name; and
the trend rating identification unit identifies, based on the request, the trend rating of the POI existing within a predetermined distance from a moving path of the mobile terminal.

8. A POI information providing system according to claim 7, wherein the recommendation degree output unit outputs the recommendation degree calculated based on the trend rating of the POI and a distance from the moving path to the POI.

9. A POI information providing system according to claim 6, wherein the trend rating acquisition unit identifies, based on a number of the POIs relating to the posted data and whether or not a posted location of the posted data and a location of the POI match each other, the trend rating by using a value obtained by summing up the matching degree obtained for each piece of the posted data for each of the POIs relating to the posted data.

10. A POI information providing system according to claim 6, wherein the trend rating acquisition unit is configured to perform one of multiplication and addition of the trend rating by and to an index defined based on date and time at which the posted data is posted.

11. A POI information providing system according to claim 6, wherein:
the POI data has a keyword corresponding to the POI name; and
the trend rating acquisition unit is configured to perform one of addition and multiplication of the trend rating to and by a predetermined value in accordance with a number of the keywords comprised in the posted data.

12. A POI information providing system according to claim 11, wherein the recommendation degree output unit outputs screen information on a screen which displays the recommendation degree of the POI, the POI name of the POI, and the keyword associated with the POI.

13. A POI information output device, comprising:
a transmission unit which transmits a request for a trend rating indicating a trend in popularity of a POI to a POI information providing device connected through a network; and
a recommendation degree output unit which outputs a recommendation degree calculated based on the trend rating acquired in response to the request,
wherein the transmission unit transmits the request for the trend rating calculated by using a predetermined calculation expression for a matching degree by matching consecutive characters between a word comprised in posted data acquired through the network and a name of the POI based on whether the name of the POI is included in the posted data.

14. A POI information providing method for a POI information providing device comprising a storage unit which stores POI data comprising a POI name,
the POI information providing method comprising:
acquiring posted data through a network;
obtaining a matching degree by matching consecutive characters between a word comprised in the posted data and the POI name for each piece of the posted data based on whether the POI name is included in the posted data, and using a predetermined calculation expression for the matching degree to calculate and acquire a trend rating indicating a trend in popularity of a POI;
identifying, when a request for the trend rating is received from another device connected through the network, the trend rating corresponding to the request; and
transmitting the trend rating identified in the identifying to the another device.

* * * * *